United States Patent
Mende

(10) Patent No.: US 7,365,676 B2
(45) Date of Patent: Apr. 29, 2008

(54) SENSOR FOR TRANSMITTING AND RECEIVING ELECTROMAGNETIC SIGNALS

(75) Inventor: Ralph Mende, Braunschweig (DE)

(73) Assignee: s.m.s smart microwave sensors GmbH, Braunschweig (DE)

( * ) Notice: Subject to any disclaimer, the term of this patent is extended or adjusted under 35 U.S.C. 154(b) by 56 days.

(21) Appl. No.: 10/519,563

(22) PCT Filed: Jul. 18, 2003

(86) PCT No.: PCT/DE03/02417

§ 371 (c)(1),
(2), (4) Date: Dec. 30, 2004

(87) PCT Pub. No.: WO2004/017093

PCT Pub. Date: Feb. 26, 2004

(65) Prior Publication Data

US 2005/0237250 A1    Oct. 27, 2005

(30) Foreign Application Priority Data

Jul. 23, 2002  (DE) ................................ 102 33 523

(51) Int. Cl.
*G01S 13/93* (2006.01)
*G08G 1/16* (2006.01)
*G01S 13/00* (2006.01)

(52) U.S. Cl. ............................ 342/70; 342/27; 342/118; 342/128; 342/133; 342/146; 342/175; 342/195; 701/300; 701/301

(58) Field of Classification Search ............ 342/70–72, 342/118, 127–145, 175, 195, 27, 28, 146; 180/167–169; 701/300, 301
See application file for complete search history.

(56) References Cited

U.S. PATENT DOCUMENTS 2,841,782 A * 7/1958 McIlwain ..................... 342/71
3,337,866 A * 8/1967 Gisonno ...................... 342/71

(Continued)

FOREIGN PATENT DOCUMENTS

DE             3622447 C1       7/1986

(Continued)

*Primary Examiner*—Bernarr E. Gregory
(74) *Attorney, Agent, or Firm*—Whitham Curtis Christofferson & Cook, PC

(57) ABSTRACT

The invention relates to a sensor comprising a housing, inside of which a transmitting antenna array that transmits electromagnetic transmission signals in a radiation area and a receiving antenna array that receives received signals reflected by at least one object located within the radiation area are provided. The inventive sensor is designed in such a manner that the transmitting antenna array is provided for transmitting transmission signals in a main radiation area (3) and in a secondary radiation area (4) situated at an angle, thereto, and in that the receiving antenna array (TX) is provided for receiving received signals reflected in both radiation areas (3, 4). This makes it possible, for example when used in a monitor vehicle (5), to monitor the area behind and next to the motor vehicle (5) with a single transmitting antenna (1).

14 Claims, 3 Drawing Sheets

U.S. PATENT DOCUMENTS

| | | | | |
|---|---|---|---|---|
| 3,735,398 A | * | 5/1973 | Ross | 180/169 |
| 3,749,197 A | * | 7/1973 | Deutsch | 180/169 |
| 3,750,169 A | * | 7/1973 | Strenglein | 342/72 |
| 3,772,690 A | * | 11/1973 | Nations | 342/72 |
| 3,778,823 A | * | 12/1973 | Sato et al. | 342/72 |
| 3,794,996 A | * | 2/1974 | Robbins et al. | 342/72 |
| 3,794,997 A | * | 2/1974 | Iwatsuki et al. | 342/72 |
| 3,848,914 A | * | 11/1974 | Wathen | 342/72 |
| 3,858,204 A | * | 12/1974 | Robbins et al. | 342/72 |
| 3,858,205 A | * | 12/1974 | Ross | 342/72 |
| 3,934,252 A | * | 1/1976 | Ross et al. | 342/72 |
| 3,935,559 A | * | 1/1976 | Straffon et al. | 342/71 |
| 4,308,536 A | * | 12/1981 | Sims et al. | 342/70 |
| 4,757,450 A | * | 7/1988 | Etoh | 180/169 |
| 5,008,678 A | * | 4/1991 | Herman | 342/70 |
| 5,045,856 A | * | 9/1991 | Paoletti | 342/70 |
| 5,115,245 A | * | 5/1992 | Wen et al. | 342/175 |
| 5,481,268 A | * | 1/1996 | Higgins | 342/70 |
| 5,495,255 A | * | 2/1996 | Komatsu et al. | 342/175 |
| 5,598,163 A | * | 1/1997 | Cornic et al. | 342/70 |
| 5,614,909 A | * | 3/1997 | Komatsu et al. | 342/70 |
| 5,684,490 A | * | 11/1997 | Young et al. | 342/70 |
| 5,712,640 A | * | 1/1998 | Andou et al. | 342/70 |
| 5,767,793 A | * | 6/1998 | Agravante et al. | 342/70 |
| 5,867,120 A | * | 2/1999 | Ishikawa et al. | 342/175 |
| 5,896,104 A | * | 4/1999 | Komatsu et al. | 342/175 |
| 5,940,011 A | * | 8/1999 | Agravante et al. | 342/70 |
| 5,949,365 A | * | 9/1999 | Wagner | 342/70 |
| 5,959,571 A | * | 9/1999 | Aoyagi et al. | 342/70 |
| 5,999,092 A | * | 12/1999 | Smith et al. | 342/71 |
| 6,005,511 A | * | 12/1999 | Young et al. | 342/70 |
| 6,008,751 A | * | 12/1999 | Kudoh | 342/70 |
| 6,025,796 A | * | 2/2000 | Crosby, II | 342/70 |
| 6,028,548 A | * | 2/2000 | Farmer | 342/70 |
| 6,043,772 A | * | 3/2000 | Voigtlaender et al. | 342/70 |
| 6,097,332 A | * | 8/2000 | Crosby, II | 342/72 |
| 6,246,359 B1 | * | 6/2001 | Asano et al. | 342/118 |
| 6,380,884 B1 | * | 4/2002 | Satou et al. | 342/70 |
| 6,573,859 B2 | * | 6/2003 | Tokoro | 342/70 |
| 6,628,227 B1 | * | 9/2003 | Rao et al. | 342/70 |
| 6,727,844 B1 | * | 4/2004 | Zimmermann et al. | 342/70 |
| 6,750,810 B2 | * | 6/2004 | Shinoda et al. | 342/70 |
| 6,816,084 B2 | * | 11/2004 | Stein | 342/70 |
| 6,853,329 B2 | * | 2/2005 | Shinoda et al. | 342/70 |
| 6,873,251 B2 | * | 3/2005 | Schiffmann et al. | 342/118 |
| 6,940,447 B2 | * | 9/2005 | Voigtlaender et al. | 342/70 |

FOREIGN PATENT DOCUMENTS

| | | |
|---|---|---|
| DE | 197 19 953 A1 | 5/1997 |
| DE | 199 51 123 A1 | 10/1999 |
| DE | 100 50 278 A1 | 10/2000 |
| DE | 100 57 564 A1 | 11/2000 |
| EP | 0 676 825 A2 | 3/1995 |

* cited by examiner

SENSOR FOR TRANSMITTING AND RECEIVING ELECTROMAGNETIC SIGNALS

BACKGROUND OF THE INVENTION

1. Field of the Invention

The invention relates to a sensor having a housing in which a transmitting antenna array for transmitting electromagnetic transmission signals in a radiation area, and a receiving antenna array for receiving reception signals which are reflected at at least one object within the radiation area are arranged.

2. Description of the Related Art

Such sensors are increasingly used, in particular as radar sensors, for sensing the surroundings of vehicles. In the extreme short range, radar sensors are used to form parking aids. Furthermore, it is known that radar sensors can also be used to monitor the lane behind a vehicle and also next to a vehicle, in order, for example, to warn the driver of an automobile against risks of collision when overtaking, opening doors etc.

The sensors must generate transmission signals in a suitable way. It is known to transmit transmission signals in the form of an individual pulse and to determine the time after which a reflected reception signal has been received. The distance between the object and the sensor is determined from the time difference between the transmission and the reception of the pulse.

It is also known (DE 100 50 278 A1) to change the frequency of the transmission signals in a skilful way in order to be able to determine a location and a speed from the frequency of the transmission signal at the time when a reflected reception signal is received, and from the frequency of the reception signal. The transmission of the signals whose frequency has been changed can be carried out virtually continuously.

In order to monitor the various surrounding areas of a vehicle, it is thus necessary to use in each case different sensors which are provided with the corresponding controllers for shaping the transmission signals. This entails considerable financial outlay.

SUMMARY OF THE INVENTION

The present invention is therefore based on the object of specifying a sensor of the type mentioned at the beginning which permits the surroundings to be sensed in a more economical way, in particular for vehicles.

In order to achieve this object, a sensor of the type mentioned at the beginning is characterized according to the invention in that the transmitting antenna array is designed to transmit transmission signals in a main radiation area and in a secondary radiation area which is at an angle thereto, and in that the receiving antenna array is configured to receive reception signals which are reflected in both radiation areas.

The sensor according to the invention thus permits two areas which are at an angle to one another to be monitored with a single sensor, preferably with a single transmitting antenna. The transmitting antenna array is designed in such a way that, in addition to its lobe-shaped main radiation area, it has a distinct, lobe-shaped secondary radiation area.

It is basically known that, in addition to the radiation area or reception area which is used, antennas also have low levels of sensitivity in secondary lobes. The antennas are generally tuned in such a way that the secondary lobes as far as possible are suppressed because in this way generally undesired signal transmissions or signal receptions are brought about.

In contrast with the above, according to the invention the transmitting antenna array is designed in such a way that the transmitting antenna array has a secondary lobe which is as distinct as possible and which is designed to be used for transmitting transmission signals.

A distinct secondary lobe is formed on a single transmitting antenna in particular by virtue of the fact that the transmitting antenna is actuated in such a way that the main radiation area is at an acute angle to a geometric orientation of the transmitting antenna. This is referred to as a squinting antenna. In a squinting antenna, a distinct secondary lobe can be formed in the opposite direction from the squinting direction.

The acute angle (squint angle) is preferably between 10° and 30°, and preferably equal to 20°.

In one preferred embodiment of the invention, the transmission range in the main radiation area is more than twice as large, preferably more than four times as large, as in the secondary radiation area. For a use in a motor vehicle it is advantageous to make the range in the main radiation area between 30 and 50 m, and in the secondary radiation area between 2 and 10 m. The angle between the main radiation area and the secondary radiation area is preferably more than 45°.

In one expedient embodiment of the invention, the receiving antenna array can have two receiving antennas, one of which is aligned with the main radiation area, and the other of which is aligned with the secondary radiation area.

However, it is also possible to form the receiving antenna array with a single receiving antenna which is configured for receiving reception signals which are reflected from both radiation areas.

It is also possible to form the receiving antenna array with two preferably identical receiving antennas which are both respectively configured to receive reception signals which are reflected from both radiation areas, as a result of which additional angle information can be obtained.

The transmitting antenna and the receiving antenna or antennas are preferably embodied as planar antennas so that the sensors can be of space-saving design.

BRIEF DESCRIPTION OF THE DRAWINGS

The invention will be explained in more detail below by means of an exemplary embodiment which is illustrated in the drawing, in which.

DETAILED DESCRIPTION OF THE PREFERRED EMBODIMENT

Figure 1:
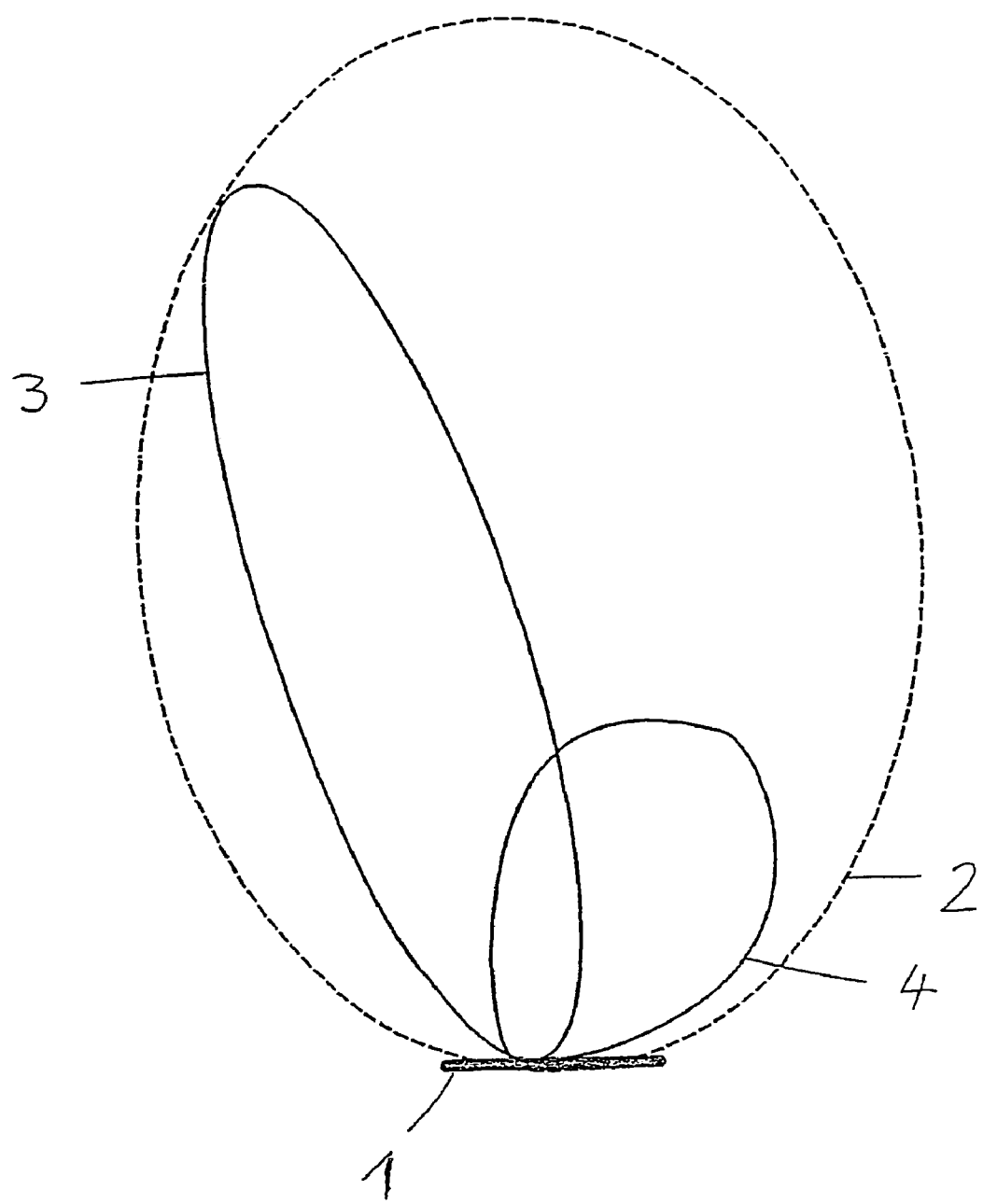
FIG. 1 shows a transmitting antenna with a main radiation area and a secondary radiation area.

FIG. 1 illustrates an antenna array whose reception area of a receiving antenna is indicated by an ellipse 2 which is represented by dashed lines.

A planar transmitting antenna 1 irradiates from its irradiation surface in a lobe-shaped main radiation area 3 and a secondary radiation area 4, which is also lobe-shaped.

The distinct secondary radiation area 4 is formed in that the transmitting antenna 1 is actuated in such a way that the main radiation area 3 is not symmetrical with respect to the perpendicular to the plane (irradiation surface) of the transmitting antenna 1 which is embodied as a planar antenna, but instead forms an angle of approximately 20° with the perpendicular. Owing to the squinting of the main radiation area 3, the distinct secondary radiation area 4, whose central axis includes an angle of >45° with the central axis of the main radiation area 3, and can also be 90° and even slightly above, is produced.

Figure 2:
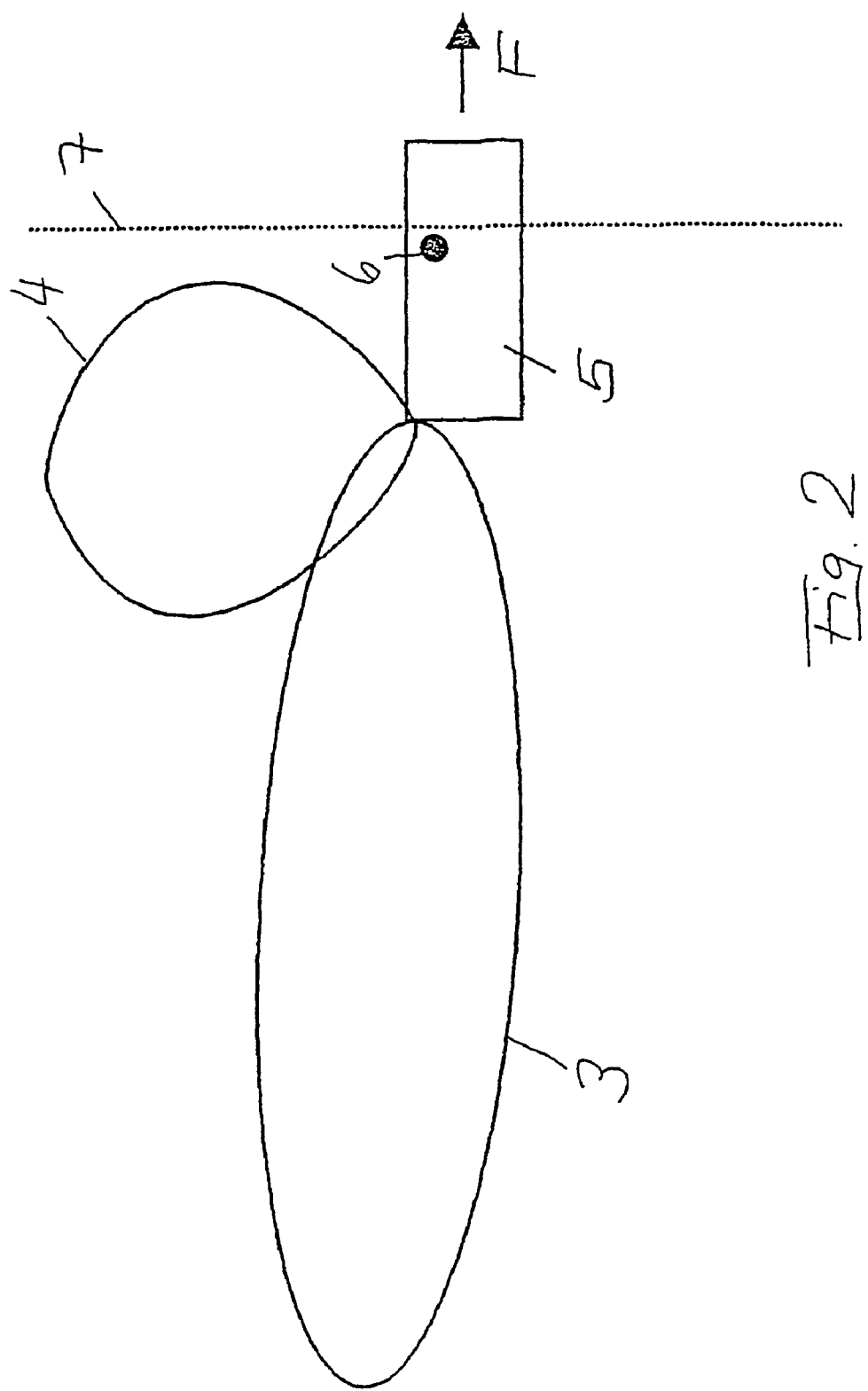
FIG. 2 is a schematic illustration of a vehicle with a radar sensor with a transmitting antenna having the properties according to FIG. 1.

FIG. 2 clarifies that the transmitting antenna 1 is expediently embodied in a motor vehicle 5 obliquely, at the squint angle, so that the main radiation area 3 extends approximately parallel to the longitudinal axis of the motor vehicle 5. The secondary radiation area 4 then extends into a region to the side of the motor vehicle 5 if the transmitting antenna 1 is mounted on a rear corner of the motor vehicle 5, viewed in the direction F of travel.

The position of a driver of the motor vehicle 5 is indicated by a continuous circle 6, and for example the field of vision of the driver who is looking in the direction F of travel is indicated by a dotted line 7. It thus becomes clear that the secondary radiation area fills virtually the entire dead angle of the driver at the position 6.

It is thus possible to use a single transmitting antenna array to monitor the area behind the motor vehicle 5 in order to detect approaching vehicles on one or more lanes, and to monitor the area next to the motor vehicle 6 in order to sense the dead angle of the driver.

The range preferably extends in the main radiation area 3 to 30 to 50 m, while the range in the secondary radiation area 4 can appropriately be between 2 and 10 m. The range in the secondary radiation area 4 typically extends to approximately 5 m.

Figure 3:
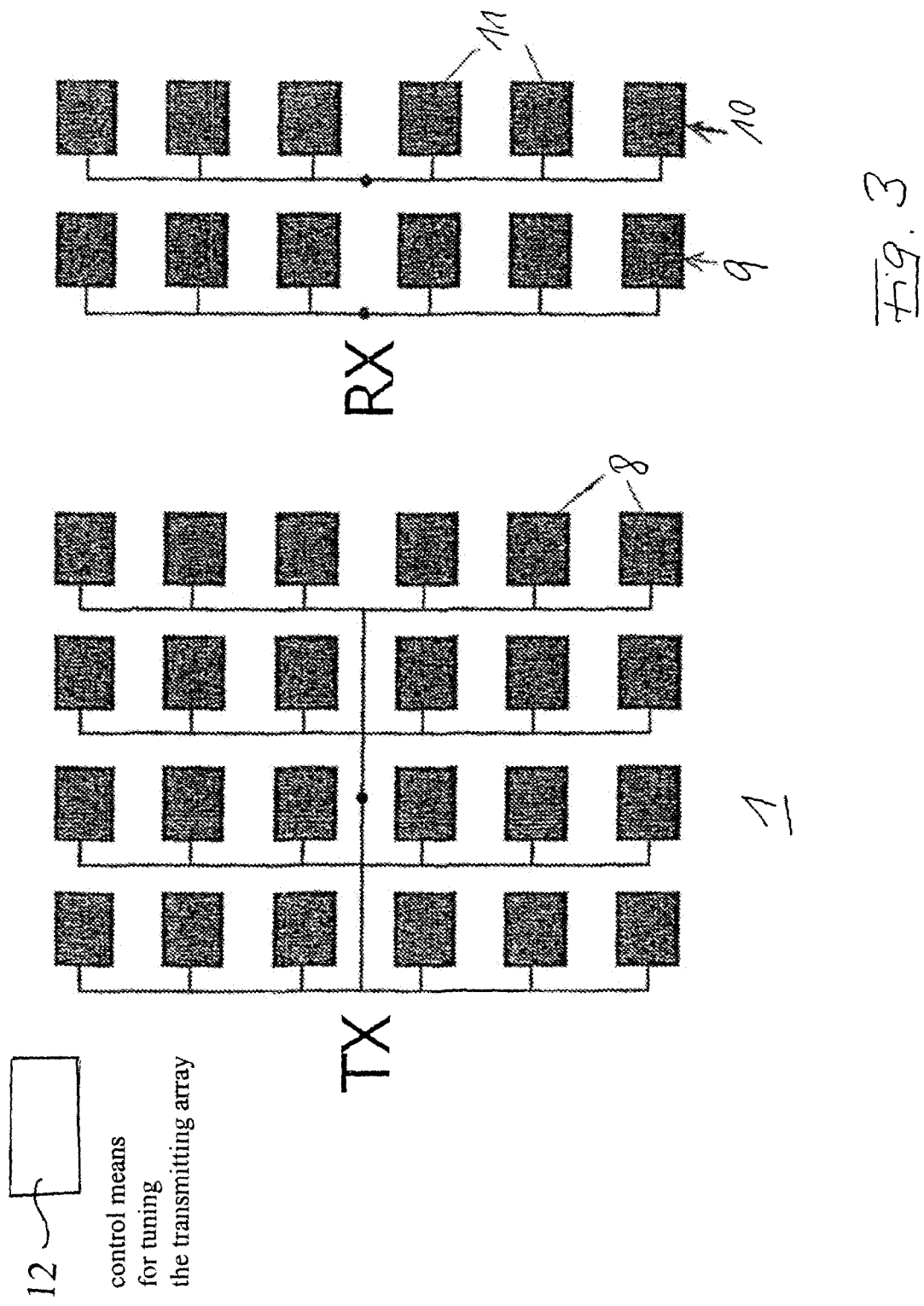
FIG. 3 is an illustration of a transmitting antenna and two receiving antennas as planar antennas.

FIG. 3 illustrates an example of a planar transmitting antenna 1 (TX) which is composed of 24 transmitting pads 8 which are actuated in such a way that a desired transmission characteristic is set by a control means for tuning the transmitting array 12. In the case of FIG. 1, the transmission characteristic for a squinting antenna is set.

The receiving antenna array RX is composed of two receiving antennas 9, 10 which are formed from two linear arrays of receiving pads 11. Their actuation determines the receiving characteristic of the receiving antennas 9, 10. The receiving antennas 9, 10 are each configured for the reception of reception signals which are reflected in the main radiation area 3, and for the reception of reception signals which are reflected in the secondary radiation area 4. It is possible to divide signals in the receiving antenna array and it is possible to detect whether an approaching object is located behind the motor vehicle 5 in the main radiation area 3, or next to the motor vehicle 5 in the secondary radiation area 4, if an angle is determined from the phase difference of the received signals using the monopulse method.

Each of the receiving antennas 9, 10 can therefore be configured to receive reception signals from both radiation areas 3, 4.

The invention claimed is:

1. A sensor, comprising:
a transmitting antenna array having radiation lobes in each of main radiation area and a secondary radiation area, where the main radiation area and secondary radiation area are angularly offset relative to each other; and
a receiving antenna array having reception lobes in each of said main radiation area and said secondary radiation area, said reception signals being reflected from objects present in said main reception area and said secondary reception area, wherein said receiving antenna array and said transmitting antenna array are positioned in a same location,
wherein objects present in said main radiation area and objects present said secondary radiation area are sensed by said sensor.

2. The sensor of claim 1 wherein said transmitting antenna array forms a single squinting antenna.

3. The sensor of claim 1 wherein said receiving antenna array is a single antenna.

4. The sensor of claim 1 wherein said receiving antenna array includes at least two antennas one of which receives reception signals from said main radiation area, and the other of which receives signals from the secondary reception area.

5. The sensor of claim 1 wherein said radiation signals transmitted by said transmitting antenna array in said main radiation area cover an area at least four times as large as said secondary radiation area.

6. The sensor of claim 1 wherein said main radiation area is located behind a car and wherein said secondary radiation area is located beside said car.

7. A sensor, comprising:
a planar transmitting antenna including a transmitting antenna array which has a plane surface in which antenna pads of said transmitting antenna array are located so as to establish an irradiation surface and which having radiation lobes in each of a main radiation area and a secondary radiation area, where the main radiation area and secondary radiation area are angularly offset relative to each other;
a receiving antenna array having reception lobes in each of said main radiation area and said secondary radiation area, said reception signals being reflected from objects which may be present in either said main radiation area or said secondary radiation area; and
a control means for tuning the transmitting array, wherein the transmitting antenna array is tuned through said control means so as to direct the main radiation area to an acute angle related to a perpendicular of said irradiation surface, thereby enhancing said secondary radiation area, and wherein objects present in either said main radiation area or said secondary radiation area are sensed by said sensor.

8. The sensor of claim 7 wherein said main radiation area has a central axis and the secondary radiation area has a central axis, and wherein between the two central axes an angle of greater than 45° is included.

9. The sensor of claim 8 wherein the angle is 90° or above.

10. The sensor of claim 7 wherein the acute angle is approximately 20°.

11. The object detection system of claim 7 wherein the acute angle is approximately 20°.

12. An object detection system for a vehicle, comprising:
a sensor positioned at a front or rear of a vehicle for detecting objects located in front of or behind said vehicle and to at least one side of said vehicle, said sensor including
a planar transmitting antenna including a transmitting antenna array which has a plane surface in which antenna pads of said transmitting antenna array are located so as to establish an irradiation surface and having radiation lobes in each of a main radiation area and a secondary radiation area, where the main radiation are and secondary radiation area are angularly offset relative to each other;

a receiving antenna array having reception lobes in each of main radiation area and said secondary radiation area, said reception signals being reflected from objects which may be present in either said main radiation area or said secondary radiation area; and a control means for tuning the transmitting array, wherein the transmitting antenna array is tuned through said control means so as to direct the main radiation area to an acute angle related to a perpendicular of said irradiation surface, thereby enhancing said secondary radiation area, and wherein objects present in either said main radiation area or said secondary radiation area are sensed by said sensor, and wherein said sensor is mounted on said vehicle so that the acute angle of the main radiation area is compensated with respect to a longitudinal axis passing through a front and a rear of said vehicle.

13. The object detection system of claim 12 wherein said main radiation area has a central axis and the secondary radiation area has a central axis, and wherein between the two central axes an angle of greater than 45° is included.

14. The object detection system of claim 13 wherein the angle is 90° or above.

* * * * *